(12) United States Patent
Griego

(10) Patent No.: US 6,824,667 B2
(45) Date of Patent: Nov. 30, 2004

(54) METAL HYDRIDE COMPOSITE MATERIALS

(75) Inventor: Thomas P. Griego, Corrales, NM (US)

(73) Assignee: Surfect Technologies, Inc., Albuquerque, NM (US)

( * ) Notice: Subject to any disclaimer, the term of this patent is extended or adjusted under 35 U.S.C. 154(b) by 7 days.

(21) Appl. No.: 10/074,666

(22) Filed: Feb. 12, 2002

(65) Prior Publication Data

US 2003/0224196 A1 Dec. 4, 2003

(51) Int. Cl.[7] .............................................. C25D 3/56
(52) U.S. Cl. ...................... 205/238; 205/257; 205/109
(58) Field of Search ................................ 205/257, 238, 205/109

(56) References Cited

U.S. PATENT DOCUMENTS

| | | |
|---|---|---|
| 3,785,801 A | 1/1974 | Benjamin |
| 4,431,561 A | 2/1984 | Ovshinsky et al. |
| 4,717,629 A | 1/1988 | Ishikawa et al. |
| 5,104,753 A | 4/1992 | Sakai et al. |
| 5,443,616 A | 8/1995 | Congdon |
| 5,487,824 A | 1/1996 | Griego |
| 5,565,079 A | 10/1996 | Griego |
| 5,879,520 A | 3/1999 | Griego |
| 5,905,004 A | 5/1999 | Sakai et al. |
| 6,287,445 B1 | 9/2001 | Lashmore et al. |

Primary Examiner—Wesley A. Nicolas
(74) Attorney, Agent, or Firm—Jeffrey D. Myers; Peacock, Myers & Adams, P.C.

(57) ABSTRACT

A method of producing metal hydride misch-metal composite powders comprising providing to a rotary flow-through electrodeposition apparatus a powder whose particles comprise one or more lanthanide alloy metals selected from the group consisting of titanium lanthanide alloy metals and nickel lanthanide alloy metals; and electrodepositing one or more non-lanthanide metals on the powder via the apparatus. Also the resulting compositions of matter and metal hydride misch-metal powders.

7 Claims, 3 Drawing Sheets

METAL HYDRIDE COMPOSITE MATERIALS

BACKGROUND OF THE INVENTION

1. Field of the Invention (Technical Field)

The present invention relates to electrodeposition of materials of various elements and surface structures on finely divided metals and other conductive powders and resulting material compositions with selectively engineered properties.

2. Background Art

The battery industries currently utilize nickel metal hydride misch-metal powders, which are an alloy of nickel or titanium and one or more rare-earth materials, such as lanthanum, or mixture of the lanthanum group formed into a composite alloy. The alloy then is reduced from an ingot size to a particle in the size range of 5 micrometers up to 150 micrometers. This material is used for nickel metal hydride rechargeable batteries as the negative electrode of the assembly and as hydrogen storage media and purification.

Cyclic lifetime is critical in the technology of Ni/MH cells. Hydride-forming electrodes made of $LaNi_5$ undergo severe deterioration of adsorption/desorption capacities during charge/discharge cycling and thus have short cycle lives. It has been known that substituting small amounts of other elements for both La and Ni can slow the deterioration. Unfortunately, attempts to prolong cycle life in this way produced undesired side effects in the form of decreases in hydrogen-absorption capacities, slow kinetics, and prolongation of activation intervals (intervals of initial charge/discharge cycling needed to achieve full capacities) and thermal inefficiency. Existing methods for improving the alloy composition include varying either the alloy composition of nickel or other metals, such as titanium, to the rare-earth composition, or to isolate the rare earth metals to provide a more specific crystal lattice in the misch-metal alloy. Such approaches have found substantial limitations in four areas. First, the mechanical integrity of the alloy becomes very weak when pure metal, such as nickel, is combined with the misch-metal, which basically crumbles during the hydrogen absorption/desorption phase of a battery's recharging cycle. Second, the existing powders have high internal electrical resistance. Third, the existing powders have poor thermal conductivity. Fourth, the catalytic element necessary to dissociate hydrogen is inefficiently distributed through the alloy bulk instead of being concentrated at the material surface where exposure to the target species occurs.

The following patents are illustrative of existing alloy compositions and methods of making same having one or more of the deficiencies noted above: U.S. Pat. No. 5,905,004, to Sakai et al., entitled "Electrode for Alkali Secondary Battery and Method for Producing the Same"; U.S. Pat. No. 5,443,616, to Congdon, entitled "Metal Hydride Composition and Method of Making"; U.S. Pat. No. 5,104,753, to Sakai et al., entitled "Hydrogen Storage Electrode and Process for Producing the Same"; U.S. Pat. No. 4,717,629, to Ishikawa et al., entitled "Compact of Hydrogen Adsorption Alloy"; and U.S. Pat. No. 4,431,561, to Ovshinsky et al., entitled "Hydrogen Storage Materials and Method of Making Same".

The present invention provides alloy compositions and methods of making same that dramatically reduce concerns in the four problem areas noted above. That is, the invention provides alloy compositions with high structural integrity, low internal resistance, good thermal conductivity, and selective catalysis. Furthermore, deposition thickness and porosity can be controlled in the present invention. Finally, catalytic elements can be selectively placed at the powder composite surface for more effective dissociation of molecular hydrogen or diatomic hydrogen to monatomic hydrogen, which intercalates into the alloy crystal matrix.

SUMMARY OF THE INVENTION (DISCLOSURE OF THE INVENTION)

The present invention is of a method of producing metal hydride misch-metal composite powders comprising: providing to a rotary flow-through electrodeposition apparatus a powder whose particles comprise one or more lanthanide alloy metals selected from the group consisting of titanium lanthanide alloy metals and nickel lanthanide alloy metals; and electrodepositing one or more non-lanthanide metals on the powder via the apparatus. In the preferred embodiment, the particles may be completely or only partially encapsulated by the one or more non-lanthanide metals. Crystalline catalytic elements (preferably one or more noble metals, most preferably palladium and/or platinum) may be deposited after the deposition of the one or more non-lanthanide metals. The one or more non-lanthanide metals preferably are one or more of nickel, copper, tin, and zinc.

The invention is additionally of a composition of matter produced by the above method.

The invention is also of a metal hydride misch-metal powder comprising a powder whose particles comprise an inner core comprising one or more lanthanide metals and a porous outer encapsulant comprising one or more non-lanthanide metals. In the preferred embodiment, the one or more non-lanthanide metals comprises one or more of nickel, copper, tin, and zinc, and the inner core additionally comprises nickel and/or titanium. The particles may additionally comprise crystalline catalytic elements on the outer surfaces of the particles. The crystalline catalytic elements are preferably one or more noble metals, most preferably palladium and/or platinum.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

Figure 1:
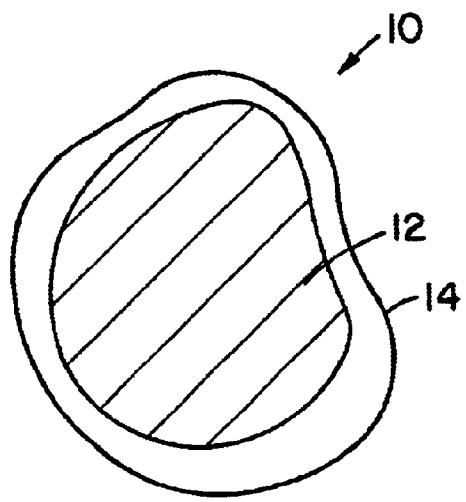
FIG. 1 illustrates a particle according to the invention with full encapsulation.

DESCRIPTION OF THE PREFERRED EMBODIMENTS (BEST MODES FOR CARRYING OUT THE INVENTION)

The present invention is of a method and alloy composition wherein selective elements electrodeposited on the surface of a reduced powder are employed. This allows the reinforcement of powder through the structural integrity of pure nickel metal or another material that is deposited on the surface. Also, the present invention permits one to selectively introduce other elemental deposits that will facilitate a higher degree of catalytic property to the surface. Furthermore, the pure metal's conductivity for both electrical electron flow and thermal conductivity is retained, which allows a battery incorporating the composition of the invention to favorably manage the heat load as the battery is being recharged, as well as to collect the electron flow at lower resistance, which improves the energy density of the battery.

The present invention permits one to employ submicron particles and to fully encapsulate or encapsulate with a porous nature or encapsulate with a porous structure plus having additional elemental metallic sites selectively introduced at the surface area; the ability to introduce preferential electrical properties into the powder matrix; the ability to use elements that conduct heat or thermal load in a more efficient manner; and the ability to include materials that help with corrosion resistance and to selectively place catalytic sites at the surface of the matrix.

As a battery electrode material, these properties result in an alloy composition that has a preferential ability to hold a higher concentration or a higher number of hydrogen atoms while working with alloys that have previously been known to have low structural integrity. The preference is also to use alloy compositions that are low cost. Therefore, noble materials are preferably not required in compositions according to the invention. The rare earth materials, if used as a misch-metal, present the lowest cost alloy partner for nickel metal hydrides or titanium misch-metal alloys. These compositions have known limitations in their structural integrity, and are therefore the target for the encapsulant of the invention to reinforce the alloy structure during the physical adsorption.

The invention is also of a method of kinetically determining the porosity of the encapsulant, which facilitates the intercalation of hydrogen into the core material. The thermal efficiency of the encapsulant also provides a preferred hydride composition resulting from the improved thermal conductivity which is the mechanism for releasing the bound hydrogen when used as hydrogen storage media to supply devices such as internal combustion engines and solid state fuel cells.

The composition can be selectively engineered to overcome any of the limitations of the existing metal hydride materials that have been commercialized and, furthermore, the invention has the ability to employ compositions that had previous inferiorities that made them commercially infeasible (such as low structural integrity).

It is preferred to use a nickel and misch-metal composition or titanium and misch-metal composition identified by its ability to intercalate the highest number of hydrogen atoms in its crystal matrix. This composition will be targeted based on its ability to hold hydrogen and not its mechanical integrity. Mechanical integrity is provided by the encapsulant.

The additional properties of thermal and electrical conductivity are engineered based on the preferred cost-versus-effect analysis for a material. Selective encapsulants include electrolytically deposited nickel, electrolytically deposited copper, tin, and electrolytically deposited zinc. Those materials are preferred encapsulants for strengthening the material but not limited to those.

Materials to influence the catalytic properties of the surface can include low-load noble metals, such as palladium or platinum. Selective and limited placement of this material still provides a cost-effective metal hydride composition. The ability to dissociate the hydrogen molecule to atomic hydrogen for absorption into the crystal matrix is facilitated by the selective catalysts, as well as the improved thermal dynamics of the encapsulating coating.

When used as a hydrogen storage media, the mechanism for desorption of the hydrogen is heat. By improving the thermal conductivity at the surface, one effectively reduces the amount of heat necessary to release the hydrogen. This provides a more dynamic kinetic for the use of this material as a portable hydrogen storage media.

Also included in the preferred embodiment is a division of powder down to the submicron range, which allows a higher surface area powder matrix that improves the electrical energy or the hydrogen storage volume that a material can provide.

The preferred method of production is to use a rotary electrodeposition device, such as those described in U.S. Pat. No. 5,879,520, entitled "Rotary Electrodeposition Apparatus"; U.S. Pat. No. 5,565,079, entitled "Fine Particle Microencapsulation and Electroforming; and U.S. Pat. No. 5,487,824, entitled "Electroplating Apparatus and Electroplating Method of Small Articles, or those described in U.S. patent application Ser. No. 09/872,214, entitled "Submicron and Nano Size Particle Encapsulation by Electrochemical Process and Apparatus", filed May 31, 2001, and U.S. Provisional Patent Application Ser. No. 60/315,503, entitled "Electrodeposition Apparatus", filed Aug. 27, 2001, which allow the centrifugal handling of finely divided powders in an aqueous solution such as electroplating electrolytes.

By performing an electrodeposition or an electrochemical deposition on the surface, the present invention provides the ability to deposit a wide range of elements on the surface in a controllable manner, which includes control over the surface morphology, crystal structure, deposit thickness, deposit dispersion and deposit density, allows a wide range of engineerable kinetics to meet any barrier that the material's alloy composition cannot support. By being able to handle submicron particles, the energy density per area of a battery can be greatly affected without increasing form factor.

Figure 2:
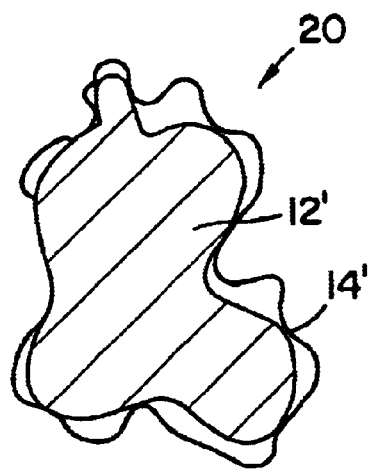
FIG. 2 illustrates a particle according to the invention with a porous encapsulation.
Figure 3:
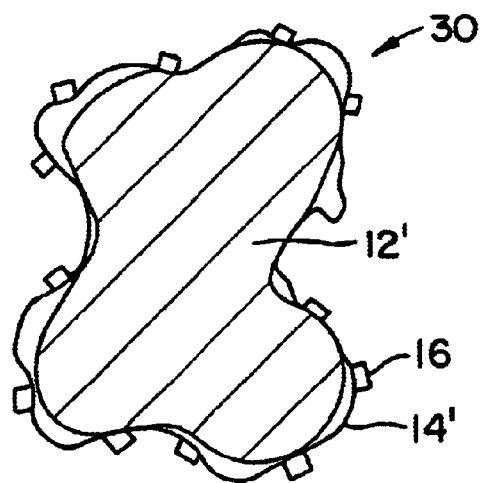
FIG. 3 illustrates a particle according to the invention with a porous encapsulation supplemented with crystalline deposits thereon.
Figure 4:
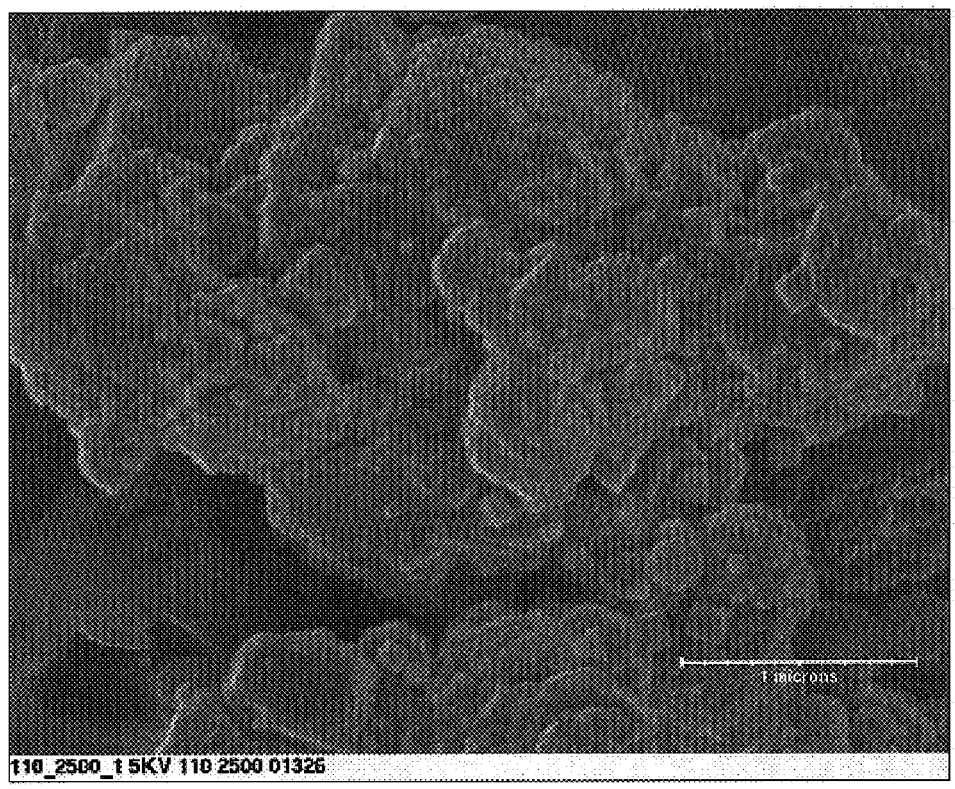
FIG. 4 is a first micrograph of the embodiment of FIG. 2.
Figure 5:
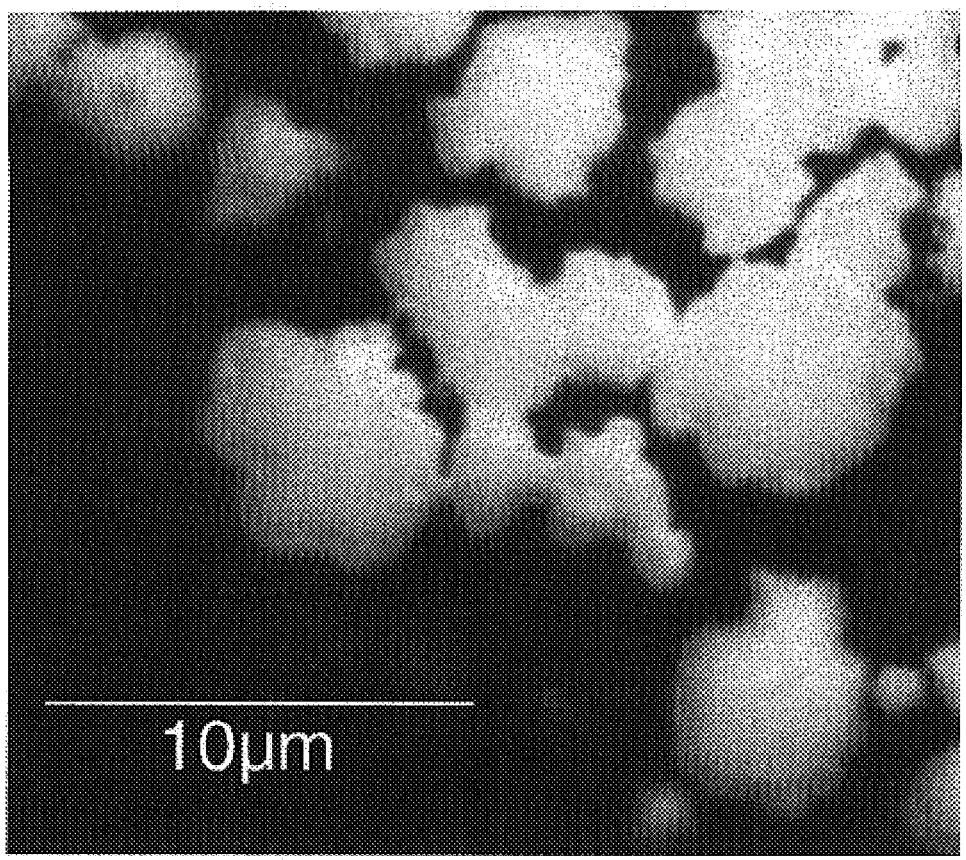
FIG. 5 is a second micrograph of the embodiment of FIG. 2.

FIG. 1 shows the core 12 of the particle 10 of the invention with cross-hatching, with a full encapsulation 14 surrounding the core of the material. FIG. 2 shows an irregular surface area core powder 12' in cross-hatched lines with an encapsulation 14' that shows thinner areas and thicker areas, the thinner areas thinning out to expose the core material, which effectively creates a porous or net-like encapsulant around the particle 20. FIG. 3 shows an irregular surface powder 12' with the porous encapsulant 14' and a crystal form 16 in a cubic shape dispersed around the surface of the material 30. These surface sites can be arranged to have preferential association with the encapsulating material or preferential association with the core material, meaning the particle would deposit preferentially based on the resistance or overpotential of the dissimilar materials. FIGS. 4 and 5 are micrographs of the surface of nickel metal hydride powders with an electrodeposit and the sporadic exposure of the core material.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of producing metal hydride misch-metal composite powders, the method comprising the steps of:

providing to a rotary flow-through electrodeposition apparatus a powder whose particles comprise one or more lanthanide alloy metals selected from the group consisting of titanium lanthanide alloy metals and nickel lanthanide alloy metals; and electrodepositing one or more non-lanthanide metals on the powder via the apparatus.

2. The method of claim 1 wherein the electrodepositing step comprises completely encapsulating the particles with the one or more non-lanthanide metals.

3. The method of claim 1 wherein the electrodepositing step comprises only partially encapsulating the particles with the one or more non-lanthanide metals.

4. The method of claim 1 additionally comprising the step of electrodepositing crystalline catalytic elements after the step of electrodepositing one or more non-lanthanide metals.

5. The method of claim 4 wherein the step of electrodepositing crystalline catalytic elements comprises electrodepositing one or more noble metals.

6. The method of claim 5 wherein the step of electrodepositing crystalline catalytic elements comprises electrodepositing one or more of palladium and platinum.

7. The method of claim 1 wherein in the electrodepositing step the one or more non-lanthanide metals comprises one or more of nickel, copper, tin, and zinc.

* * * * *